(12) United States Patent
Tamai et al.

(10) Patent No.: US 8,440,332 B2
(45) Date of Patent: May 14, 2013

(54) PERPENDICULAR MAGNETIC RECORDING MEDIUM AND MAGNETIC STORAGE DEVICE USING THE SAME

(75) Inventors: Ichiro Tamai, Kanagawa (JP); Kiwamu Tanahashi, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 657 days.

(21) Appl. No.: 12/384,850

(22) Filed: Apr. 8, 2009

(65) Prior Publication Data

US 2009/0257144 A1 Oct. 15, 2009

(30) Foreign Application Priority Data

Apr. 8, 2008 (JP) ................................. 2008-100420

(51) Int. Cl.
*G11B 5/66* (2006.01)
(52) U.S. Cl.
USPC ......... 428/829; 428/830; 428/836.2; 360/135
(58) Field of Classification Search ....................... None
See application file for complete search history.

(56) References Cited

U.S. PATENT DOCUMENTS

| | | | |
|---|---|---|---|
| 6,174,597 B1 * | 1/2001 | Yusu et al. | 428/332 |
| 6,620,533 B2 | 9/2003 | Hikosaka et al. | |
| 7,147,942 B2 | 12/2006 | Uwazumi et al. | |
| 7,470,474 B2 * | 12/2008 | Sakawaki et al. | 428/829 |
| 7,601,445 B2 * | 10/2009 | Iwasaki et al. | 428/836.2 |
| 7,892,663 B2 * | 2/2011 | Nakagawa et al. | 428/829 |
| 2006/0154113 A1 * | 7/2006 | Watanabe et al. | 428/836.2 |
| 2006/0204791 A1 | 9/2006 | Sakawaki et al. | |
| 2006/0286413 A1 * | 12/2006 | Liu et al. | 428/829 |
| 2007/0042227 A1 * | 2/2007 | Iwasaki et al. | 428/832 |
| 2007/0223142 A1 * | 9/2007 | Takekuma et al. | 360/131 |
| 2007/0231609 A1 * | 10/2007 | Ajan et al. | 428/828.1 |
| 2008/0096053 A1 * | 4/2008 | Bian et al. | 428/829 |
| 2009/0226763 A1 * | 9/2009 | Oka | 428/829 |

FOREIGN PATENT DOCUMENTS

| | | |
|---|---|---|
| JP | 2001-222809 | 8/2001 |
| JP | 2003-178413 | 6/2003 |
| JP | 2004-310910 | 11/2004 |
| JP | 2005-100537 | 4/2005 |
| JP | 2006-164440 | 6/2006 |
| JP | 2006-351055 | 12/2006 |
| JP | 2007-317255 A | 12/2007 |
| JP | 2009-99243 A | 5/2009 |
| WO | 2007/114402 A1 | 11/2007 |

* cited by examiner

*Primary Examiner* — Kevin Bernatz
(74) *Attorney, Agent, or Firm* — Zilka-Kotab, PC

(57) ABSTRACT

Embodiments of the present invention provide a perpendicular magnetic recording medium that reduces the noise of granular recording layers, obtains sufficient overwrite characteristic that suppresses an increase in the magnetic cluster size, and allows high-density recording. According to one embodiment, a perpendicular magnetic recording medium comprising substrate having thereon at least soft magnetic layer, nonmagnetic intermediate layer, a perpendicular recording layer and protective layer formed in that order. The perpendicular recording layer consists of three or more layers of first recording layer, a second recording layer, and a third recording layer from the side nearer to the substrate. The first recording layer and the second recording layer have a granular structure comprising a grain boundary of an oxide surrounding ferromagnetic crystal grains containing Co and Pt, and the third recording layer has a non-granular structure mainly comprising Co and not containing an oxide. The grain boundary of the first recording layer contains Si, Cr and oxygen, and at least one element selected from Ti, Ta and Nb, and the grain boundary of the second recording layer contains Cr and oxygen, or contains Cr and oxygen and at least one element selected from Si, W and V.

16 Claims, 5 Drawing Sheets

(a)

(b)

(a)

(b)

(a)

(b)

PERPENDICULAR MAGNETIC RECORDING MEDIUM AND MAGNETIC STORAGE DEVICE USING THE SAME

CROSS-REFERENCE TO RELATED APPLICATION

The instant nonprovisional patent application claims priority to Japanese Patent Application No. 2008-100420 filed Apr. 8, 2008, and which is incorporated by reference in its entirety herein for all purposes.

BACKGROUND OF THE INVENTION

Increases in the capacity of hard disk drives has been demanded more in recent years. Further, with advancements incorporating hard disk drives in household electric appliances, the demands for miniaturization and capacity increases of hard disk drives is increasing. A hard disk drive using a longitudinal recording system has achieved a real recording density exceeding 20 gigabit per 1 $cm^2$. However, it has become difficult to further increase recording density by using this system. Therefore, a perpendicular recording system is now used instead of the longitudinal recording system. The influence of a diamagnetic field in a high density recording area is relatively small in the perpendicular recording system as compared with the longitudinal recording system, and it is thought that the perpendicular recording system is advantageous in increasing recording density.

In a perpendicular magnetic recording medium for use in the perpendicular recording system, a recording layer comprising a CoCrPt alloy conventionally used in longitudinal recording media, has been utilized. However, for the purpose of further reduction of a noise, a granular-type recording layer comprising a CoCrPt alloy with oxygen or oxide is added, is proposed. The granular-type recording layers are disclosed in Japanese Patent Publication Nos. 2001-222809 and 2003-178413. In the case of conventional recording layers comprising a CoCrPt alloy, noise is reduced by segregation of a nonmagnetic material mainly comprising Cr into a grain boundary. The segregation is achieved by making use of phase separation of Co and Cr, which causes magnetic isolation of the magnetic crystal grains. For heightening the noise reduction, addition of Cr in a large amount is helpful, but adding large amount of Cr causes a large amount of Cr to be in the magnetic crystal grains. Large amounts Cr in the magnetic crystal grain can cause magnetic anisotropy energy to lower and the stability of recording signals to deteriorate. However, in the case of a granular-type recording layer of a CoCrPt alloy to which oxygen or oxide is added, a media can be formed without adding a large amount of Cr. Since the oxide is easily separated from the magnetic crystal grains, if a template that is a cue to form a grain boundary of oxide has been formed as the under layer, then a structure where the oxide surrounds magnetic crystal grains can be formed. Since the amount of Cr contained in magnetic crystal grains can be reduced, it is possible to reduce noise without lowering magnetic anisotropy energy.

In the perpendicular recording system, recording and reproducing efficiencies in the perpendicular direction can be heightened by the combination of a magnetic recording medium having a soft magnetic layer between the recording layer and the substrate with a single magnetic pole head. The single magnetic pole head can be a magnetic head having a structure with a shield on the trailing side of the main magnetic pole (a TS head), or a magnetic head having a structure with a shield surrounding the main magnetic pole (a WAS head). These head types improve the recording magnetic field gradient. Although recording magnetic field gradient is improved with a magnetic head provided with such a shield, the magnetic field strength is lowered at the same time. Therefore, sufficient overwriting characteristics may be difficult to obtain with a medium in which intergranular interaction in the granular recording layer is sufficiently reduced for the purpose of noise reduction. Thus, the improvement of overwriting characteristics is obtained by forming a thick non-granular structural ferromagnetic layer on a granular recording layer (see Japanese Patent Publication Nos. 2004-310910 and 2006-351055).

Further, lowering of a noise by the improvement of a granular recording layer is also considered. As an example of such consideration, it is proposed to use two or more kinds of oxides to form the grain boundary of a granular recording layer (Japanese Patent Publication Nos. 2005-100537 and 2006-164440).

A granular-type recording layer comprising a CoCrPt alloy to which oxygen or an oxide is added, is good in grain boundary formation, and therefore reduces noise. Further, sufficient overwriting characteristics can be obtained by the formation of a non-granular structural recording layer on a granular structural recording layer even when a magnetic head provided with a shield is used. However, further improvement is required for achieving higher density recording. Moreover, since the decrease of magnetic field strength in recording by narrowing of a track of a magnetic head is possible, the distance between the magnetic head and a soft magnetic layer is shortened in order to compensate for the decrease of magnetic field strength. In that case, if an intermediate layer is thinned more than necessary, the crystallographic orientation of a recording layer is deteriorated and it becomes difficult to form a template structure that is a cue to form a grain boundary of oxide. Accordingly, thinning of a recording layer and a protective layer is also important.

BRIEF SUMMARY OF THE INVENTION

Embodiments of the present invention help to provide a perpendicular magnetic recording medium which reduces the noise of granular recording layers, obtains sufficient overwrite characteristic that suppresses an increase in the magnetic cluster size, and allows high-density recording. According to the embodiment of FIG. 1, a perpendicular magnetic recording medium comprising substrate 10 having thereon at least soft magnetic layer 11, nonmagnetic intermediate layer 13, a perpendicular recording layer and protective layer 17 in this order, wherein the perpendicular recording layer consists of three or more layers of first recording layer 14, second recording layer 15 and third recording layer 16 from the side nearer to the substrate. The first recording layer and the second recording layer have a granular structure comprising a grain boundary of an oxide surrounding ferromagnetic crystal grains containing Co and Pt, and the third recording layer has a non-granular structure mainly comprising Co and not containing an oxide. The grain boundary of the first recording layer contains Si, Cr and oxygen, and at least one element selected from Ti, Ta and Nb, and the grain boundary of the second recording layer contains Cr and oxygen, or contains Cr and oxygen and at least one element selected from Si, W and V.

DETAILED DESCRIPTION OF THE INVENTION

Figure 1:
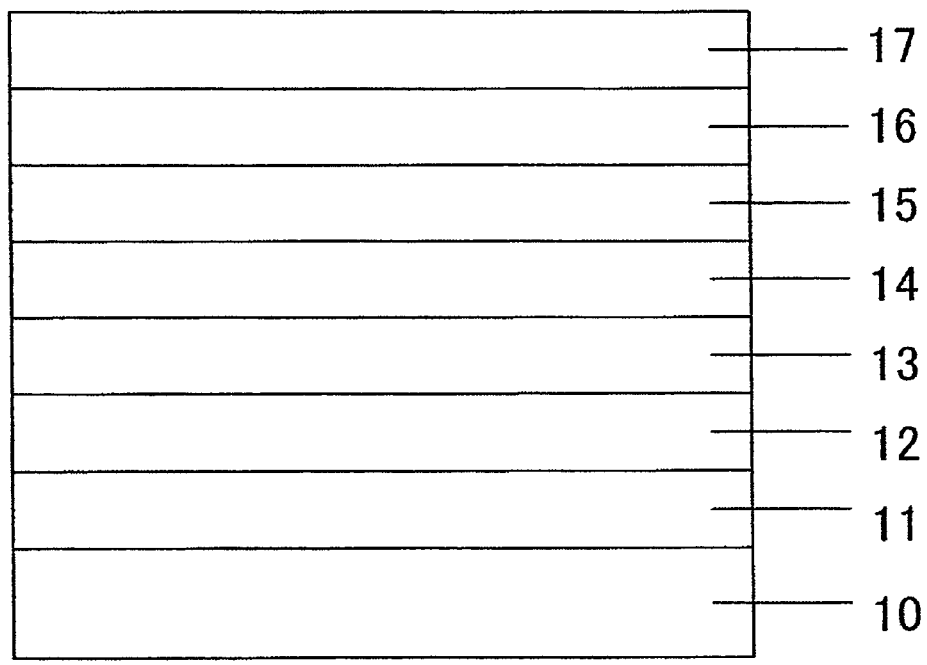
FIG. 1 is a typical cross-sectional drawing showing the layers of a perpendicular magnetic recording medium as one example of embodiments of the invention.

Embodiments of the present invention relate to a magnetic recording medium capable of large capacity data recording, and a magnetic storage device using the same.

The embodiments provide a perpendicular magnetic recording medium using a granular-type recording layer reduced in generation of noises, and capable of high density recording by thinning a recording layer.

The embodiments also provide a magnetic storage device making the best use of the performances of the perpendicular magnetic recording medium.

The embodiments include three or more recording layers of different compositions. The layers are laminated and the oxide of a granular recording layer contiguous to the intermediate layer is a composite oxide.

Embodiments also comprise a substrate having thereon at least a soft magnetic layer, a nonmagnetic intermediate layer, a perpendicular recording layer and a protective layer in this order, wherein the perpendicular recording layer consists of three or more layers of a first recording layer, a second recording layer and a third recording layer from the side nearer to the substrate. The first recording layer and the second recording layer have a granular structure comprising a grain boundary of an oxide surrounding ferromagnetic crystal grains containing Co and Pt. The third recording layer has a non-granular structure mainly comprising Co and not including an oxide. The grain boundary of the first recording layer includes Si, Cr and oxygen, and at least one element selected from Ti, Ta and Nb, and the grain boundary of the second recording layer includes Cr and oxygen, or includes Cr and oxygen and at least one element selected from Si, W and V.

It may be important to form a grain boundary to reduce the noise of the granular recording layers. It is known that oxides of Si, Cr, Ti and Ta are suitable for the materials of a grain boundary. However, it is necessary to use a large amount of oxide to reduce a noise by making a grain boundary thick, and as a result growth of crystal grains is hindered to be sub-grained. The sub-grains cause the characteristics to be deteriorated when a large amount of oxide is added, in any case of the oxides. Further, even when the crystal grains are not sub-grained, if the thickness of the grain boundary is too thick, sufficient overwriting characteristics cannot be ensured without thickening a non-granular structural recording layer formed thereon. When the non-granular structural recording layer is formed thickly, magnetic cluster size becomes large, which causes increase in noise. With respect to such a problem, it has been found that intergranular interaction can be reduced without using a large amount of oxide when the grain boundary of the first recording layer formed on the intermediate layer contains Si, Cr and oxygen, and at least one element selected from Ti, Ta and Nb. However, if a non-granular structural recording layer is directly formed on the granular recording layer using a composite oxide, it may be necessary to form a relatively thick non-granular structural recording layer for obtaining sufficient overwriting characteristics. Therefore, it has been found that, even when a recording layer of a non-granular structure is formed thin, overwriting characteristics can be sufficiently obtained by forming a second recording layer between a first recording layer and a non-granular structural recording layer, and for the grain boundary of the second recording layer to contain Cr and oxygen, or contain Cr and oxygen and at least one element selected from Si, W and V.

The thickness of the second recording layer may be 0.2 nm or more and 5 nm or less. When the thickness of the second recording layer is thinner than 0.2 nm, the non-granular structural recording layer should be formed thick.

The concentration of Cr in the first recording layer may be higher than 4 at. % and lower than 14 at. %. When the concentration of Cr is lower than 4 at. %, the proportion of the Cr oxide present in the grain boundary decreases and the effect of making composite of the oxide becomes small. When the concentration of Cr is higher than 14 at. %, a large amount of Cr is present in the crystal grains, and therefore the coefficient of magnetic anisotropy of the crystal grains lowers dramatically, and thermal decay characteristics are deteriorated.

The concentration of the oxide included in the second recording layer may be 10 vol. % or more and 30 vol. % or less. When the addition concentration is less than 10 vol. %, intergranular interaction of the second recording layer becomes strong and the noise unfavorably increases. When the concentration of the oxide is more than 30 vol. %, the effect of the third recording layer becomes insufficient and overwriting characteristics deteriorate.

Further, by forming a magnetic storage device comprising the perpendicular magnetic recording medium according to embodiments of the invention, driving of the magnetic recording medium in the recording direction, using a magnetic head comprising a recording part and a reproducing part, driving the magnetic head relative to the magnetic recording medium, and signal processing to perform waveform process of an input signal and an output signal to the magnetic head, a magnetic storage device having recording density of 70 gigabit or more per 1 $cm^2$ can be achieved.

Embodiments of the present invention will be described in detail below with reference to examples and comparative examples.

EXAMPLE 1

FIG. 1 is a cross-sectional drawing typically showing the perpendicular magnetic recording medium as one example of an embodiment of the invention. The perpendicular magnetic recording medium of one embodiment was manufactured with a sputtering apparatus C-3010 (a product of ANELVA Corporation). The sputtering apparatus consists of ten process chambers and one substrate introducing chamber, and each chamber is independently evacuated. After every chamber was evacuated up to vacuum degree of $2 \times 10^{-5}$ Pa or less, the carrier carrying a substrate was moved to each processing chamber and processing was carried out. Soft magnetic layer 11, fcc seed layer 12, intermediate layer 13, first recording layer 14, second recording layer 15, third recording layer 16, and protective layer 17 were laminated in order on substrate 10 with a DC magnetron sputtering method. As substrate 10, a glass substrate having a thickness of 0.635 mm and a diameter of 65 mm was used. Heating of the substrate was not performed and, on the condition of Ar gas pressure of 0.7 Pa, as soft magnetic layer 11, a film obtained by laminating two layers of Fe-34 at. % Co-10 at. % Ta-5 at. % Zr alloy films having a thickness of 15 nm via an Ru film having a thickness of 0.6 nm, and as fcc seed layer 12, an Ni-7 at. % W film having a thickness of 7 nm were formed. As intermediate layer 13, an Ru film having a thickness of 8 nm was formed with an Ar gas pressure of 1 Pa, and an Ru film having a thickness of 8 nm was formed thereon with an Ar gas pressure of 5 Pa. First recording layer 14 was formed with a thickness of 10 nm by using argon gas mixed with 1.5% of oxygen and with a gas pressure of 5 Pa. Second recording layer 15 was formed in a thickness of 3 nm with a target of a Co-14 at. % Cr-18 at. % Pt alloy added with 10 mol % of $SiO_2$ with an Ar gas pressure of 4 Pa. As third recording layer 16, a Co-12 at. % Cr-12 at. % Pt-10 at. % B film was formed with a thickness of 4 nm with an Ar gas pressure of 0.7 Pa. Lastly, a carbon film having a thickness of 3.5 nm was formed by using argon gas mixed with 8% of nitrogen and with 0.6 Pa as protective layer 17.

Media were manufactured by using targets obtained by adding to a Co-14 at. % Cr-18 at. % Pt alloy, 5 mol % $SiO_2$+5 mol % $TiO_2$, 5 mol % $SiO_2$+1.5 mol % $Ta_2O_5$, 5 mol % $SiO_2$+1.5 mol % $Nb_2O_5$, 4 mol % $SiO_2$+4 mol % $TiO_2$+0.5 mol % $Ta_2O_5$, 4 mol % $SiO_2$+1.5 mol % $Ta_2O_5$+0.5 mol % $Nb_2O_5$, 4 mol % $SiO_2$+4 mol % $TiO_2$+0.5 mol % $Nb_2O_5$, and 3 mol % $SiO_2$+4 mol % $TiO_2$+0.5 mol % $Ta_2O_5$+0.5 mol % $Nb_2O_5$, respectively, as the first recording layers.

As Comparative Examples 1-1 to 1-9, media were manufactured by changing the oxides added to first recording layer 14. The manufacturing conditions were the same as in the Examples except for changing first recording layer 14. In the media in the Examples, mixtures of $SiO_2$ and $TiO_2$, $SiO_2$ and $Ta_2O_5$, and $SiO_2$ and $Nb_2O_5$ were used as the oxides, while in the Comparative Examples, a single oxide or mixtures of different oxides were used.

In the measurement of the magnetic characteristics of the media, a Kerr effect-type magnetometer was used. The Kerr loop was measured by detecting Kerr rotation angle while applying a magnetic field to the film surface of the sample in the vertical direction. A Sweep of magnetic field was performed at a constant speed from +2,000 kA/m to −2,000 kA/m and from −2,000 kA/m to +2,000 kA/m for 30 seconds.

Recording and reproducing characteristics were evaluated with a spin-stand. A magnetic head having a single magnetic pole type recording device having a track width of 70 nm and a reproducing device making use of giant magneto-resistance effect having a track width of 60 nm was used in evaluation, and evaluation was performed on the conditions of a peripheral speed of 10 m/s, angle of skew of 0°, and magnetic spacing of about 8 nm. Medium SNR is the ratio of the reproduction output at the time of recording the signal of 7,874 fr/mm and the integrated noise at the time of recording the signal of 55,120 fr/mm. Magnetic characteristics and recording and reproducing characteristics of the media in the Examples and the Comparative Examples are shown in Table 1 below.

From the comparison of the samples in the Examples with those in the Comparative Examples 1-1 to 1-4, it can be understood that higher Hc and improved SNR can be obtained by using oxide mixtures rather than single oxides. Further from the comparison of the samples in the Examples with those in the Comparative Examples 1-5 to 1-9, combinations of oxides effective in the improvement of medium SNR are shown. A high medium SNR is obtained by the combination of $SiO_2$ as essential and one or more oxides selected from $TiO_2$, $Ta_2O_5$ and $Nb_2O_5$. Combinations such as $TiO_2$ and $Ta_2O_5$, $Ta_2O_5$ and $Nb_2O_5$, and $TiO_2$ and $Nb_2O_5$ not containing $SiO_2$ have no improving effect of medium SNR. Further, even when $SiO_2$ is included, $Al_2O_3$ and MgO do not show improving effect of medium SNR due to the mixture of oxides.

On observation of the first recording layers of the media in the embodiments of the invention with a transmission electron microscope, the average grain sizes of Examples 1-1 to 1-7 were from 7.9 to 8.2 nm, and the average grain size in Comparative Example 1-1 was 8.1 nm and equivalent. The widths of the grain boundaries in the Examples were from 0.6 to 0.7 nm, and that in Comparative Example 1-1 was 0.7 nm and equivalent. Conspicuous differences were not seen as compared with the samples in other Comparative Examples. With respect to the medium in Example 1-1, as a result of analysis of composition of the first recording layer with TEM-EELS, it was confirmed that Si, Ti, Cr and O abounded in the grain boundary as compared to the crystal grains. Further, the ratios of Cr/Co in the crystal grains and grain boundary part in Example 1-1 were respectively 0.17 and 0.45. The ratios of the medium in Comparative Example 1-1 were 0.19 and 0.37 from the similar composition analysis. The distribution of 10% or so was observed in each medium but it was confirmed that the medium in embodiments of the invention was lower in Co concentration in the grain boundary. When Co concentration in the grain boundary is high, since intergranular interaction is strong even when grain boundary width is formed widely, magnetic cluster size becomes large, which becomes a primary factor in increase of noise. In the recording layer of embodiments of the invention low in Co concentration in the grain boundary part, it is thought that noise is reduced by the fact that magnetic cluster size becomes small even when differences are not seen in crystal grain sizes and grain boundary width. Further, it was confirmed that other media according to embodiments of the invention were also low in Co concentration in the grain boundary part of the first recording layer.

TABLE 1

| | Recording Layer 1 | Hc (kOe) | SNR (dB) |
|---|---|---|---|
| Example 1-1 | 90[68 at. % Co-14 at. % Cr-18 at. % Pt]—5$SiO_2$—5$TiO_2$ | 5.2 | 23.3 |
| Example 1-2 | 93.5[68 at. % Co-14 at. % Cr-18 at. % Pt]—5$SiO_2$—1.5$Ta_2O_5$ | 5.1 | 23.1 |
| Example 1-3 | 93.5[68 at. % Co-14 at. % Cr-18 at. % Pt]—5$SiO_2$—1.5$Nb_2O_5$ | 5.1 | 23.0 |
| Example 1-4 | 91.5[68 at. % Co-14 at. % Cr-18 at. % Pt]—4$SiO_2$—4$TiO_2$—0.5$Ta_2O_5$ | 5.4 | 23.5 |
| Example 1-5 | 94[68 at. % Co-14 at. % Cr-18 at. % Pt]—4$SiO_2$—1.5$Ta_2O_5$—0.5$Nb_2O_5$ | 5.0 | 23.2 |
| Example 1-6 | 91.5[68 at. % Co-14 at. % Cr-18 at. % Pt]—4$SiO_2$—4$TiO_2$—0.5$Nb_2O_5$ | 5.2 | 23.3 |
| Example 1-7 | 92[68 at. % Co-14 at. % Cr-18 at. % Pt]—3$SiO_2$—4$TiO_2$—0.5$Ta_2O_5$—0.5$Nb_2O_5$ | 5.3 | 23.2 |
| Comp. Ex. 1-1 | 90[68 at. % Co-14 at. % Cr-18 at. % Pt]—10$SiO_2$ | 4.8 | 19.4 |
| Comp. Ex. 1-2 | 90[68 at. % Co-14 at. % Cr-18 at. % Pt]—10$TiO_2$ | 4.5 | 18.8 |
| Comp. Ex. 1-3 | 97[68 at. % Co-14 at. % Cr-18 at. % Pt]—3$Ta_2O_5$ | 4.6 | 18.9 |
| Comp. Ex. 1-4 | 97[68 at. % Co-14 at. % Cr-18 at. % Pt]—3$Nb_2O_5$ | 4.3 | 18.7 |
| Comp. Ex. 1-5 | 93.5[68 at. % Co-14 at. % Cr-18 at. % Pt]—5$TiO_2$—1.5$Ta_2O_5$ | 4.6 | 18.8 |
| Comp. Ex. 1-6 | 97[68 at. % Co-14 at. % Cr-18 at. % Pt]—1.5$Ta_2O_5$—1.5$Nb_2O_5$ | 4.5 | 18.6 |
| Comp. Ex. 1-7 | 93.5[68 at. % Co-14 at. % Cr-18 at. % Pt]—5$TiO_2$—1.5$Nb_2O_5$ | 4.6 | 18.5 |
| Comp. Ex. 1-8 | 92[68 at. % Co-14 at. % Cr-18 at. % Pt]—5$SiO_2$—3$Al_2O_3$ | 4.1 | 17.9 |
| Comp. Ex. 1-9 | 90[68 at. % Co-14 at. % Cr-18 at. % Pt]—5$SiO_2$—5MgO | 4.0 | 18.1 |

Next, media were manufactured by changing the concentrations of oxides in first recording layer 14 of the medium having the structure as described above. The combination of oxides in this case was $SiO_2$ and $TiO_2$. As Comparative Examples 1-10 to 1-14, media were also manufactured by various combinations of $TiO_2$ and $Ta_2O_5$ as the oxides in the first recording layer. The recording and reproducing characteristics of these media are shown in Table 2 below.

layer 16 was changed. As recording and reproducing characteristics, besides the medium SNR evaluated in the same manner as in Example 1, as overwriting characteristics (OW), signal of 4,590 fr/mm was overwritten on signal of 27,560 fr/mm, and the signal intensity ratio of the remained factor not erased of signal of 27,560 fr/mm and 4,590 fr/mm was found. Further, deterioration amount of signal (ATI) in the case of recording on the adjacent track was evaluated according to the

TABLE 2

|  | Recording Layer 1 | SNR (dB) |
|---|---|---|
| Example 1-8 | 90[68 at. % Co-14 at. % Cr-18 at. % Pt]—1$SiO_2$—9$TiO_2$ | 23.1 |
| Example 1-9 | 90[68 at. % Co-14 at. % Cr-18 at. % Pt]—3$SiO_2$—7$TiO_2$ | 23.4 |
| Example 1-10 | 90[68 at. % Co-14 at. % Cr-18 at. % Pt]—5$SiO_2$—5$TiO_2$ | 23.3 |
| Example 1-11 | 90[68 at. % Co-14 at. % Cr-18 at. % Pt]—7$SiO_2$—3$TiO_2$ | 23.2 |
| Example 1-12 | 90[68 at. % Co-14 at. % Cr-18 at. % Pt]—9$SiO_2$—1$TiO_2$ | 23.2 |
| Comp. Ex. 1-10 | 96.4[68 at. % Co-14 at. % Cr-18 at. % Pt]—1$TiO_2$—2.6$Ta_2O_5$ | 18.8 |
| Comp. Ex. 1-11 | 94.9[68 at. % Co-14 at. % Cr-18 at. % Pt]—3$TiO_2$—2.1$Ta_2O_5$ | 18.9 |
| Comp. Ex. 1-12 | 93.5[68 at. % Co-14 at. % Cr-18 at. % Pt]—5$TiO_2$—1.5$Ta_2O_5$ | 18.8 |
| Comp. Ex. 1-13 | 92.1[68 at. % Co-14 at. % Cr-18 at. % Pt]—7$TiO_2$—0.9$Ta_2O_5$ | 19.0 |
| Comp. Ex. 1-14 | 90.6[68 at. % Co-14 at. % Cr-18 at. % Pt]—9$TiO_2$—0.4$Ta_2O_5$ | 18.9 |

It was found that high medium SNR could be obtained in every composition in the Examples. While in Comparative Examples 1-10 to 1-14, medium SNR was equivalent but lower than that of the medium in the Examples in every composition. Accordingly, it is thought that the kinds of oxides to be mixed are important, and SNR is not influenced by the mixing ratio of oxides.

EXAMPLE 2

Media were manufactured by changing first recording layer 14 and second recording layer 15 in the medium having the similar structure as in Example 1. As Comparative Examples 2-1 to 2-3, media in which the oxides in second recording layer 15 were changed were manufactured. As Comparative Examples 2-4 to 2-6, media were manufactured in which the same first recording layer (Co-14 at. % Cr-18 at. % Pt)-5 mol % $SiO_2$-5 mol % $TiO_2$, was formed as second recording layer 15, and the film thickness of third recording following method. First, data was recorded by track recording density of 55,120 fr/mm, and $Log_{10}$ (error bit number/read bit number) at the time of reading the data of $10^8$ bits was found as bit error rate (BER). Next, when the signal of track recording density of 55,120 fr/mm was recorded on a plurality of tracks by varying the track distance, the track density was determined from the track distance when off track allowance of BER being −3 or less is 30% of the track distance. A track data was recorded on a track, and bit error rate (BER 1) of the former track after recording the data on the adjacent track one time was measured by using the above track density, and also bit error rate (BER 10,000) of the former track after recording the data on the adjacent track 10,000 time was measured. The difference between these error rates (BER 10,000-BER 1) was taken as ATI. The recording and reproducing characteristics are shown in Table 3 below. Here, tmag 1 is the film thickness of the first recording layer, tmag 2 is the film thickness of the second recording layer, and tmag 3 is the film thickness of the third recording layer.

TABLE 3

|  | Recording Layer 1 | tmag 1 (nm) | Recording Layer 2 |
|---|---|---|---|
| Example 2-1 | 90[68 at. % Co-14 at. % Cr-18 at. % Pt]—5$SiO_2$—5$TiO_2$ | 10 | 90[68 at. % Co-14 at. % Cr-18 at. % Pt]—10$SiO_2$ |
| Example 2-2 | 90[68 at. % Co-14 at. % Cr-18 at. % Pt]—5$SiO_2$—5$TiO_2$ | 10 | 94[68 at. % Co-14 at. % Cr-18 at. % Pt]—6$Cr_2O_3$ |
| Example 2-3 | 90[68 at. % Co-14 at. % Cr-18 at. % Pt]—5$SiO_2$—5$TiO_2$ | 10 | 94[68 at. % Co-14 at. % Cr-18 at. % Pt]—6$WO_3$ |
| Example 2-4 | 90[68 at. % Co-14 at. % Cr-18 at. % Pt]—5$SiO_2$—5$TiO_2$ | 10 | 96[68 at. % Co-14 at. % Cr-18 at. % Pt]—4$V_2O_5$ |
| Example 2-5 | 93.5[68 at. % Co-14 at. % Cr-18 at. % Pt]—5$SiO_2$—1.5$Ta_2O_5$ | 10 | 90[68 at. % Co-14 at. % Cr-18 at. % Pt]—10$SiO_2$ |
| Example 2-6 | 93.5[68 at. % Co-14 at. % Cr-18 at. % Pt]—5$SiO_2$—1.5$Ta_2O_5$ | 10 | 94[68 at. % Co-14 at. % Cr-18 at. % Pt]—6$Cr_2O_3$ |
| Example 2-7 | 93.5[68 at. % Co-14 at. % Cr-18 at. % Pt]—5$SiO_2$—1.5$Ta_2O_5$ | 10 | 94[68 at. % Co-14 at. % Cr-18 at. % Pt]—6$WO_3$ |
| Example 2-8 | 93.5[68 at. % Co-14 at. % Cr-18 at. % Pt]—5$SiO_2$—1.5$Ta_2O_5$ | 10 | 96[68 at. % Co-14 at. % Cr-18 at. % Pt]—4$V_2O_5$ |
| Example 2-9 | 93.5[68 at. % Co-14 at. % Cr-18 at. % Pt]—5$SiO_2$—1.5$Nb_2O_5$ | 10 | 90[68 at. % Co-14 at. % Cr-18 at. % Pt]—10$SiO_2$ |
| Example 2-10 | 93.5[68 at. % Co-14 at. % Cr-18 at. % Pt]—5$SiO_2$—1.5$Nb_2O_5$ | 10 | 94[68 at. % Co-14 at. % Cr-18 at. % Pt]—6$Cr_2O_3$ |
| Example 2-11 | 93.5[68 at. % Co-14 at. % Cr-18 at. % Pt]—5$SiO_2$—1.5$Nb_2O_5$ | 10 | 94[68 at. % Co-14 at. % Cr-18 at. % Pt]—6$WO_3$ |

TABLE 3-continued

| | | | |
|---|---|---|---|
| Example 2-12 | 93.5[68 at. % Co-14 at. % Cr-18 at. % Pt]—5SiO$_2$—1.5Nb$_2$O$_5$ | 10 | 96[68 at. % Co-14 at. % Cr-18 at. % Pt]—4V$_2$O$_5$ |
| Comp. Ex. 2-1 | 90[68 at. % Co-14 at. % Cr-18 at. % Pt]—5SiO$_2$—5TiO$_2$ | 10 | 90[68 at. % Co-14 at. % Cr-18 at. % Pt]—10TiO$_2$ |
| Comp. Ex. 2-2 | 90[68 at. % Co-14 at. % Cr-18 at. % Pt]—5SiO$_2$—5TiO$_2$ | 10 | 97[68 at. % Co-14 at. % Cr-18 at. % Pt]—3Ta$_2$O$_5$ |
| Comp. Ex. 2-3 | 90[68 at. % Co-14 at. % Cr-18 at. % Pt]—5SiO$_2$—5TiO$_2$ | 10 | 97[68 at. % Co-14 at. % Cr-18 at. % Pt]—3Nb$_2$O$_5$ |
| Comp. Ex. 2-4 | 90[68 at. % Co-14 at. % Cr-18 at. % Pt]—5SiO$_2$—5TiO$_2$ | 10 | 90[68 at. % Co-14 at. % Cr-18 at. % Pt]—5SiO$_2$—5TiO$_2$ |
| Comp. Ex. 2-5 | 90[68 at. % Co-14 at. % Cr-18 at. % Pt]—5SiO$_2$—5TiO$_2$ | 10 | 90[68 at. % Co-14 at. % Cr-18 at. % Pt]—5SiO$_2$—5TiO$_2$ |
| Comp. Ex. 2-6 | 90[68 at. % Co-14 at. % Cr-18 at. % Pt]—5SiO$_2$—5TiO$_2$ | 10 | 90[68 at. % Co-14 at. % Cr-18 at. % Pt]—5SiO$_2$—5TiO$_2$ |

| | tmag 2 (nm) | Recording Layer 3 | tmag 3 (nm) | OW (dB) | SNR (dB) | ATI |
|---|---|---|---|---|---|---|
| Example 2-1 | 3 | 66 at. % Co-12 at. % Cr-12 at. % Pt-10 at. % B | 4 | 33.2 | 23.3 | 0.24 |
| Example 2-2 | 3 | 66 at. % Co-12 at. % Cr-12 at. % Pt-10 at. % B | 4 | 34.3 | 23.1 | 0.21 |
| Example 2-3 | 3 | 66 at. % Co-12 at. % Cr-12 at. % Pt-10 at. % B | 4 | 32.9 | 22.8 | 0.31 |
| Example 2-4 | 3 | 66 at. % Co-12 at. % Cr-12 at. % Pt-10 at. % B | 4 | 32.9 | 22.8 | 0.31 |
| Example 2-5 | 3 | 66 at. % Co-12 at. % Cr-12 at. % Pt-10 at. % B | 4 | 33.5 | 22.9 | 0.25 |
| Example 2-6 | 3 | 66 at. % Co-12 at. % Cr-12 at. % Pt-10 at. % B | 4 | 34.6 | 23.1 | 0.24 |
| Example 2-7 | 3 | 66 at. % Co-12 at. % Cr-12 at. % Pt-10 at. % B | 4 | 33.1 | 23.2 | 0.42 |
| Example 2-8 | 3 | 66 at. % Co-12 at. % Cr-12 at. % Pt-10 at. % B | 4 | 33.4 | 22.8 | 0.18 |
| Example 2-9 | 3 | 66 at. % Co-12 at. % Cr-12 at. % Pt-10 at. % B | 4 | 33.4 | 22.8 | 0.18 |
| Example 2-10 | 3 | 66 at. % Co-12 at. % Cr-12 at. % Pt-10 at. % B | 4 | 35.0 | 22.7 | 0.25 |
| Example 2-11 | 3 | 66 at. % Co-12 at. % Cr-12 at. % Pt-10 at. % B | 4 | 35.0 | 22.7 | 0.25 |
| Example 2-12 | 3 | 66 at. % Co-12 at. % Cr-12 at. % Pt-10 at. % B | 4 | 34.1 | 22.9 | 0.27 |
| Comp. Ex. 2-1 | 3 | 66 at. % Co-12 at. % Cr-12 at. % Pt-10 at. % B | 4 | 28.5 | 19.4 | 1.72 |
| Comp. Ex. 2-2 | 3 | 66 at. % Co-12 at. % Cr-12 at. % Pt-10 at. % B | 4 | 28.3 | 18.8 | 1.69 |
| Comp. Ex. 2-3 | 3 | 66 at. % Co-12 at. % Cr-12 at. % Pt-10 at. % B | 4 | 28.6 | 18.9 | 1.83 |
| Comp. Ex. 2-4 | 3 | 66 at. % Co-12 at. % Cr-12 at. % Pt-10 at. % B | 4 | 27.5 | 18.7 | 2.0 |
| Comp. Ex. 2-5 | 3 | 66 at. % Co-12 at. % Cr-12 at. % Pt-10 at. % B | 5 | 28.8 | 20.2 | 2.3 |
| Comp. Ex. 2-6 | 3 | 66 at. % Co-12 at. % Cr-12 at. % Pt-10 at. % B | 6 | 32.1 | 22.1 | 2.6 |

Every medium in the embodiments of the Examples showed good OW and medium SNR. Contrary to this, the media in Comparative Examples 2-1 to 2-4 were insufficient in OW and medium SNR was also degraded. When a non-granular structural recording layer is formed on a granular structural recording layer, metallic grains are difficult to grow on a grain boundary of oxides. Such granular recording layers as those using the oxides in these Comparative Examples are small in the surface energy of grain boundary of oxides, and it is thought that particularly metallic grains are therefore difficult to grow. Also, as Comparative Examples 2-4 to 2-6, when a recording layer that is good in grain boundary growth as the first recording layer is used as the second recording layer, good OW and medium SNR can be obtained by forming a thick third recording layer, but ATI is suddenly deteriorated. When a third recording layer is formed thick, sufficient OW can be obtained due to the decrease of reversal magnetic field, but at the same time, magnetic cluster size becomes large in such a recording layer and the layer is liable to be influenced by the adjacent track. Accordingly, it is thought that oxides of Si, Cr, W and V are suitable for the grain boundary of a second recording layer. When compared with other comparative examples, it is thought to be important that the absolute value of standard formation free energy of oxide is lower than Si.

Next, media were manufactured in the same manner as in the media having the structure described above except for changing the thickness of the second recording layer 15. In Examples 2-13 to 2-17, the total film thickness of first recording layer 14 and second recording layer 15 was made 13 nm. In Examples 2-18 to 2-22, the thickness of first recording layer 14 was fixed at 10 nm, and the thickness of each of second recording layers 15 was changed. The recording and reproducing characteristics are shown in Table 4 below.

TABLE 4

| | Recording Layer 1 | tmag 1 (nm) |
|---|---|---|
| Ex. 2-13 | 90[68 at. % Co-14 at. % Cr-18 at. % Pt]—5SiO$_2$—5TiO$_2$ | 12.8 |
| Ex. 2-14 | 90[68 at. % Co-14 at. % Cr-18 at. % Pt]—5SiO$_2$—5TiO$_2$ | 12 |
| Ex. 2-15 | 90[68 at. % Co-14 at. % Cr-18 at. % Pt]—5SiO$_2$—5TiO$_2$ | 11 |
| Ex. 2-16 | 90[68 at. % Co-14 at. % Cr-18 at. % Pt]—5SiO$_2$—5TiO$_2$ | 9 |
| Ex. 2-17 | 90[68 at. % Co-14 at. % Cr-18 at. % Pt]—5SiO$_2$—5TiO$_2$ | 8 |
| Ex. 2-18 | 90[68 at. % Co-14 at. % Cr-18 at. % Pt]—5SiO$_2$—5TiO$_2$ | 10 |
| Ex. 2-19 | 90[68 at. % Co-14 at. % Cr-18 at. % Pt]—5SiO$_2$—5TiO$_2$ | 10 |
| Ex. 2-20 | 90[68 at. % Co-14 at. % Cr-18 at. % Pt]—5SiO$_2$—5TiO$_2$ | 10 |
| Ex. 2-21 | 90[68 at. % Co-14 at. % Cr-18 at. % Pt]—5SiO$_2$—5TiO$_2$ | 10 |
| Ex. 2-22 | 90[68 at. % Co-14 at. % Cr-18 at. % Pt]—5SiO$_2$—5TiO$_2$ | 10 |
| Comp. Ex. 2-7 | 90[68 at. % Co-14 at. % Cr-18 at. % Pt]—5SiO$_2$—5TiO$_2$ | 13 |
| Comp. Ex. 2-8 | 90[68 at. % Co-14 at. % Cr-18 at. % Pt]—5SiO$_2$—5TiO$_2$ | 7 |
| Comp. Ex. 2-9 | 90[68 at. % Co-14 at. % Cr-18 at. % Pt]—5SiO$_2$—5TiO$_2$ | 6 |

TABLE 4-continued

| | | | | |
|---|---|---|---|---|
| Comp. Ex. 2-10 | 90[68 at. % Co-14 at. % Cr-18 at. % Pt]—5SiO$_2$—5TiO$_2$ | | 10 | |
| Comp. Ex. 2-11 | 90[68 at. % Co-14 at. % Cr-18 at. % Pt]—5SiO$_2$—5TiO$_2$ | | 10 | |

| | Recording Layer 2 | tmag 2 (nm) | OW (dB) | SNR (dB) |
|---|---|---|---|---|
| Ex. 2-13 | 90[68 at. % Co-14 at. % Cr-18 at. % Pt]—5SiO$_2$—5TiO$_2$ | 0.2 | 33.2 | 23.3 |
| Ex. 2-14 | 90[68 at. % Co-14 at. % Cr-18 at. % Pt]—5SiO$_2$—5TiO$_2$ | 1 | 34.3 | 23.1 |
| Ex. 2-15 | 90[68 at. % Co-14 at. % Cr-18 at. % Pt]—5SiO$_2$—5TiO$_2$ | 2 | 34.4 | 23.2 |
| Ex. 2-16 | 90[68 at. % Co-14 at. % Cr-18 at. % Pt]—5SiO$_2$—5TiO$_2$ | 4 | 34.8 | 23.0 |
| Ex. 2-17 | 90[68 at. % Co-14 at. % Cr-18 at. % Pt]—5SiO$_2$—5TiO$_2$ | 5 | 35.1 | 22.9 |
| Ex. 2-18 | 90[68 at. % Co-14 at. % Cr-18 at. % Pt]—5SiO$_2$—5TiO$_2$ | 0.2 | 35.2 | 23.2 |
| Ex. 2-19 | 90[68 at. % Co-14 at. % Cr-18 at. % Pt]—5SiO$_2$—5TiO$_2$ | 1 | 34.8 | 23.3 |
| Ex. 2-20 | 90[68 at. % Co-14 at. % Cr-18 at. % Pt]—5SiO$_2$—5TiO$_2$ | 2 | 35.0 | 23.4 |
| Ex. 2-21 | 90[68 at. % Co-14 at. % Cr-18 at. % Pt]—5SiO$_2$—5TiO$_2$ | 3 | 34.1 | 23.1 |
| Ex. 2-22 | 90[68 at. % Co-14 at. % Cr-18 at. % Pt]—5SiO$_2$—5TiO$_2$ | 5 | 34.6 | 22.9 |
| Comp. Ex. 2-7 | 90[68 at. % Co-14 at. % Cr-18 at. % Pt]—5SiO$_2$—5TiO$_2$ | 0 | 27.5 | 19.6 |
| Comp. Ex. 2-8 | 90[68 at. % Co-14 at. % Cr-18 at. % Pt]—5SiO$_2$—5TiO$_2$ | 6 | 36.2 | 19.2 |
| Comp. Ex. 2-9 | 90[68 at. % Co-14 at. % Cr-18 at. % Pt]—5SiO$_2$—5TiO$_2$ | 7 | 36.7 | 18.7 |
| Comp. Ex. 2-10 | 90[68 at. % Co-14 at. % Cr-18 at. % Pt]—5SiO$_2$—5TiO$_2$ | 6 | 34.9 | 19.5 |
| Comp. Ex. 2-11 | 90[68 at. % Co-14 at. % Cr-18 at. % Pt]—5SiO$_2$—5TiO$_2$ | 7 | 35.3 | 19.4 |

Every medium in the examples of embodiments of the invention was good in medium SNR. It can be seen from the comparison of Examples 2-13 to 2-18 with Comparative Example 2-7 that OW can be sufficiently improved and high medium SNR can be obtained by forming a second recording layer even as thin as 0.2 nm. From the comparison of the media in embodiments of the invention and those in Comparative Examples 2-8 to 2-11, it is understood that when the second recording layer is formed with a thickness of 5 nm or more, a good OW can be obtained but medium SNR lowers. Accordingly, in the medium structure as in the embodiments, the effects can be exhibited when the second recording layer is formed in a thickness of 0.2 nm or more and 5 nm or less.

Figure 2:
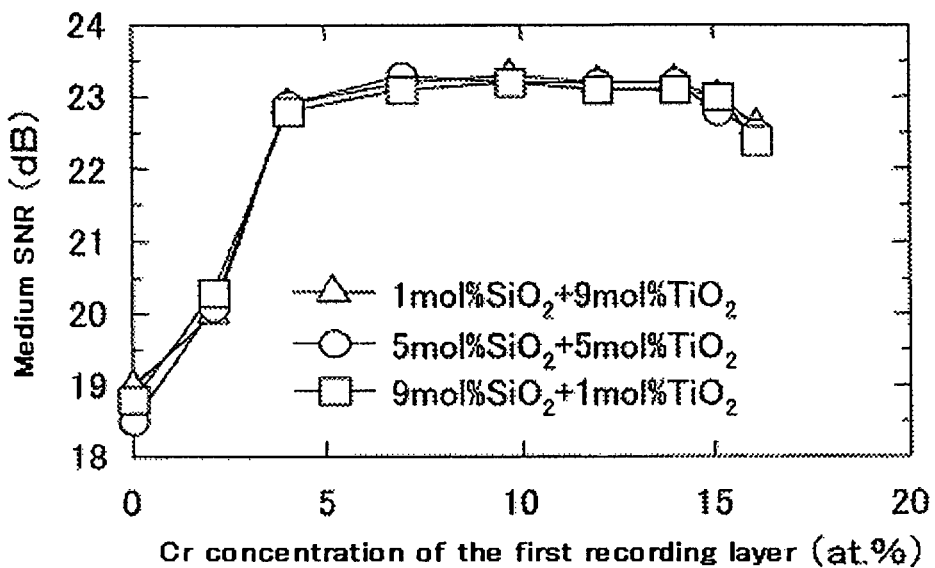
FIGS. 2(a) and 2(b) are drawings showing the relationship between medium SNR and Ku and the concentration of Cr in the first recording layer.
Figure 2:
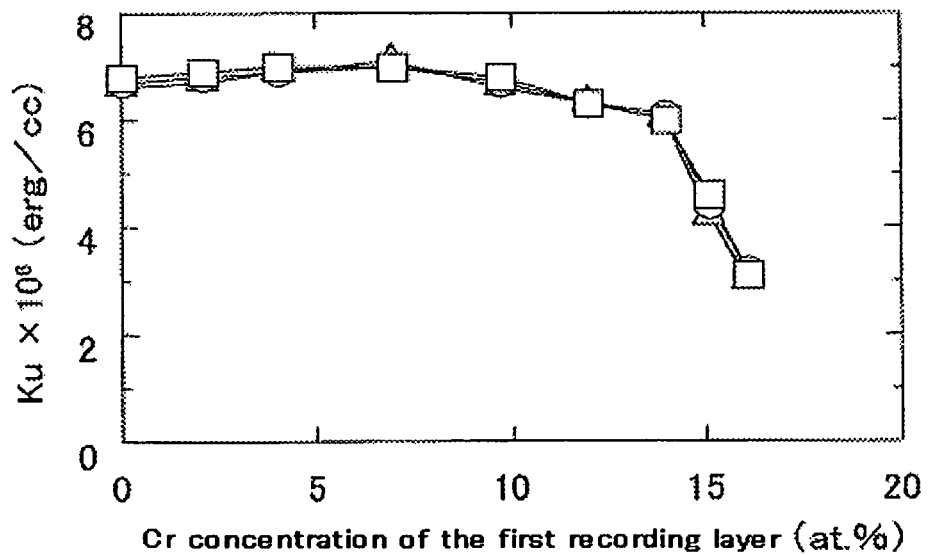

Media were manufactured in the same manner as in the medium having the structure described above except for changing the Cr concentration in first recording layer 14. Since the composition of target and the composition of the formed film are different, in particular Cr concentration is liable to lower, the composition of the recording layer was found according to X-ray photoelectron spectroscopy. The sample was sputtered from the surface in the depth direction with an ion gun having accelerating voltage of 500 V, and the range of the length of 1.5 mm and the width of 0.1 mm was analyzed with aluminum Kα-ray as the X-ray source. The contents of the elements were found by detecting the spectra in the vicinity of energies corresponding to each of is electron of C, 1s electron of O, 2s electron of Si, 2p electron of Cr, 2p electron of Co, 3d electron of Ru, 4f electron of Pt, etc. Medium SNR and the coefficient of magnetic anisotropy (Ku) are shown in FIGS. 2(a) and 2(b). The horizontal axis of the graph is the Cr concentration contained in the first recording layer.

As is apparent from FIGS. 2(a) and 2(b), high medium SNR can be obtained by the addition of Cr in concentration of 4% or more to the first recording layer. However, when the Cr concentration in the first recording layer exceeds 14%, Ku is suddenly degraded. High Hc can be obtained from a recording layer with high Ku even when the layer is thinned, and advantageous to increase recording density. A recording layer with low Ku is conspicuous in the reduction of Hc when the layer is thinned, and such a layer may not be preferred because deterioration of heat resisting demagnetization characteristics is possible. Accordingly, Cr concentration in the first recording layer may be 4 at. % or more and 14 at. % or less. Further, it is sufficient to adjust oxide concentration in the first recording layer to the desired grain size and grain boundary width. For making a crystal grain size 6 nm and a grain boundary width 1 nm, the total amount of oxides will suffice 30 vol. % or so, and in that case it is necessary to adjust the amount taking the molecular weights and densities of the oxides into consideration. For example, 11 mol % of SiO$_2$ alone and 5.5 mol % of Ta$_2$O$_5$ alone respectively correspond to 30 vol. % of a grain boundary. However, since Cr oxide is also formed when oxygen is added at the time of forming a recording layer, adjustment of oxide concentration is necessary considering the fact that Cr oxide is increased.

In the Example, soft magnetic layer 11 is directly formed on substrate 10, but it is also possible to use a pre-coat layer for ensuring adhesion of a substrate and a soft magnetic layer. An Ni alloy, an Al alloy and a Co alloy may be used for that purpose, and the materials and compositions are not especially restricted so long as adhesion can be secured. An Fe-34 at. % Co-10 at. % Ta-5 at. % Zr alloy was used in soft magnetic layer 11 in the Example, but the composition is not limited thereto, and it is also possible to use other FeCoTaZr alloys, FeCoB alloys, FeCoTaZrB alloys, CoTaZr alloys, FeCoTaCrZr alloys, and CoNbZr alloys. Further, an Ni-7 at. % W alloy was used as fcc seed layer 12 in the Example, but the composition is not restricted thereto, so long as the material is nonmagnetic and has an fcc structure. In addition, as metals having an fcc structure, Pt alloys, Pd alloys, Cu alloys and Ni alloys may be used. Since the grain size and surface roughness of the fcc seed layer are reflected on Ru and fine structure of the recording layer, it is possible to vary the film thickness within the range of from 3 to 12 nm or so for obtaining a desired grain size. Ru was used as intermediate layer 13 in the Example, but layer 13 is not restricted thereto, so long as the material has an hcp structure and can accelerate segregation of the recording layer. Ru alloys and nonmagnetic granular intermediate layers mainly comprising CoCr can also be used.

EXAMPLE 3

Media were manufactured in the same manner as in the media having the structure in Example 1 except for changing second recording layer 15. As the second recording layer, targets of a Co-7 at. % Cr-18 at. % Pt alloy, a Co-10 at. % Cr-18 at. % Pt alloy, a Co-17 at. % Cr-18 at. % Pt alloy, and a Co-21 at. % Cr-18 at. % Pt alloy to which $SiO_2$ different in addition concentration was added were used to manufacture the media.

Figure 3:
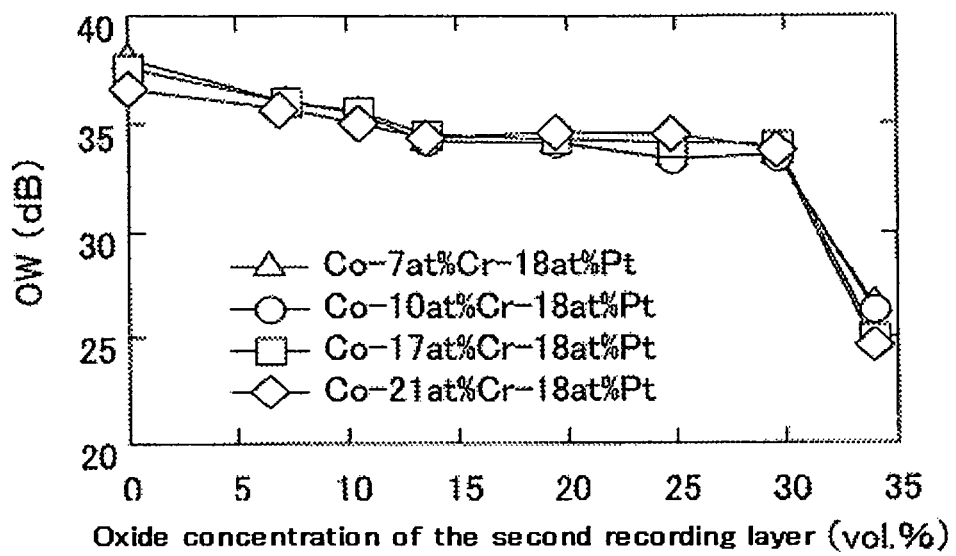
FIGS. 3(a) and 3(b) are drawings showing the relationship between OW, medium SNR, and the concentration of oxide in the second recording layer.
Figure 3:
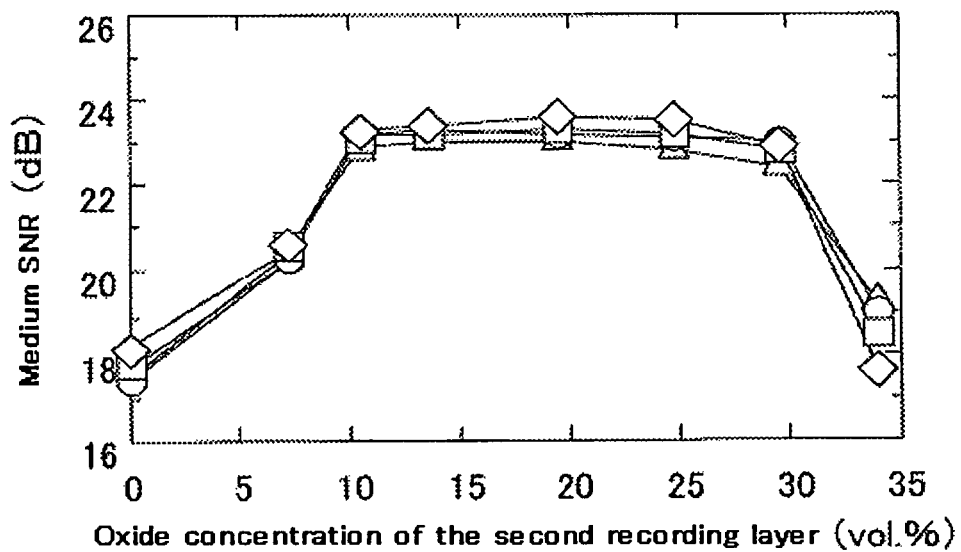

OW and medium SNR are shown in FIGS. 3(a) and 3(b). The horizontal axis of the graph is the oxide concentration contained in the second recording layer. As is apparent from FIGS. 3(a) and 3(b), the difference due to the Cr concentration contained in the second recording layer was not seen, and OW was suddenly degenerated with the increase of the oxide concentration. This is presumably due to the fact that if a large amount of oxides are added to the second recording layer, the third recording layer necessitates a thick film thickness for becoming a continuous film. The medium SNR can obtain excellent characteristics in any Cr concentration in the range of oxide concentration of from 10 vol. % to 30 vol. %. When oxide concentration is high, OW is insufficient, as a result medium SNR is degenerated, while when oxide concentration is too low, it is thought that intergranular interaction in the second recording layer becomes strong, as a result noise increases. Accordingly, the oxide concentration contained in the second recording layer may be 10 vol. % or more and 30 vol. % or less.

Subsequently, media were manufactured in the same manner as in the media having the structure described above except for changing the oxide concentration in the case where the kinds of oxide in the second recording layer 15 were changed. Magnetic characteristics and recording and reproducing characteristics are shown in Table 5 below.

be obtained. While in Comparative Examples 3-1, 3-3 and 3-5, the oxide concentrations were too high, so that OW was insufficient, and medium SNR are degenerated. Also, as is seen in Comparative Examples 3-2, 3-4 and 3-6, when the oxide concentrations are too low, intergranular interaction in the second recording layer becomes strong, as a result Hc lowers and, although OW can be sufficiently obtained, medium SNR is degraded. Accordingly, the oxide concentration added to the second recording layer may be 10 vol. % or more and 30 vol. % or less even when these oxides are used.

EXAMPLE 4

Media were manufactured in the same manner as in the media having the structure in Example 1 except for changing third recording layer 16. As the third recording layer, a CoCrPtB alloy, a CoCrPtBMo alloy, a CoCrPtTa alloy and a CoCrPtTi alloy were used.

Saturation magnetization (Ms) in the third recording layer was found by manufacturing a sample for evaluation having no soft magnetic layer and the third recording layer alone, and cutting off an evaluation sample of 8 mm square. A vibration sample magnetometer was used in the measurement. Saturation magnetization was found from the magnetization curve measured by applying magnetization of maximum of 1,035 kA/m in the vertical direction to the film surface of the sample. As recording and reproducing characteristics, besides the above-described evaluations, resolution (Re) was evaluated. Signal of 27,560 fr/mm and signal of 7,874 fr/mm were measured, and the ratio thereof was found. Magnetic

TABLE 5

| | Recording Layer 2 | Concentration of Oxide (vol %) | Hc (kOe) | OW (dB) | SNR (dB) |
|---|---|---|---|---|---|
| Example 3-1 | 95[68 at. % Co-14 at. % Cr-18 at. % Pt]—5$Cr_2O_3$ | 17.6 | 5.2 | 33.2 | 23.3 |
| Example 3-2 | 96[68 at. % Co-14 at. % Cr-18 at. % Pt]—4$Cr_2O_3$ | 14.4 | 5.2 | 33.2 | 23.3 |
| Example 3-3 | 95[68 at. % Co-14 at. % Cr-18 at. % Pt]—5$V_2O_5$ | 28.3 | 5.2 | 34.3 | 23.1 |
| Example 3-4 | 96[68 at. % Co-14 at. % Cr-18 at. % Pt]—4$V_2O_5$ | 23.8 | 5.1 | 33.8 | 23.2 |
| Example 3-5 | 97[68 at. % Co-14 at. % Cr-18 at. % Pt]—3$V_2O_5$ | 18.9 | 5.1 | 34.8 | 23.3 |
| Example 3-6 | 98[68 at. % Co-14 at. % Cr-18 at. % Pt]—2$V_2O_5$ | 13.3 | 5.2 | 33.1 | 23.2 |
| Example 3-7 | 95[68 at. % Co-14 at. % Cr-18 at. % Pt]—5$WO_3$ | 19.1 | 5.2 | 33.4 | 23.3 |
| Example 3-9 | 96[68 at. % Co-14 at. % Cr-18 at. % Pt]—4$WO_3$ | 15.8 | 5.2 | 35.0 | 23.4 |
| Example 3-10 | 97[68 at. % Co-14 at. % Cr-18 at. % Pt]—3$WO_3$ | 12.2 | 5.2 | 35.0 | 23.4 |
| Comp. Ex. 3-1 | 90[68 at. % Co-14 at. % Cr-18 at. % Pt]—10$Cr_2O_3$ | 31.0 | 5.7 | 27.5 | 18.1 |
| Comp. Ex. 3-2 | 98[68 at. % Co-14 at. % Cr-18 at. % Pt]—2$Cr_2O_3$ | 7.6 | 4.1 | 36.9 | 17.8 |
| Comp. Ex. 3-3 | 93[68 at. % Co-14 at. % Cr-18 at. % Pt]—7$V_2O_5$ | 36.1 | 5.6 | 26.8 | 17.4 |
| Comp. Ex. 3-4 | 99[68 at. % Co-14 at. % Cr-18 at. % Pt]—1$V_2O_5$ | 7.1 | 4.2 | 36.5 | 18.9 |
| Comp. Ex. 3-5 | 90[68 at. % Co-14 at. % Cr-18 at. % Pt]—10$WO_3$ | 33.3 | 5.8 | 26.3 | 18.5 |
| Comp. Ex. 3-6 | 98[68 at. % Co-14 at. % Cr-18 at. % Pt]—2$WO_3$ | 8.4 | 4.1 | 37.1 | 16.3 |

It can be seen that in every medium in the Example of embodiments of the invention, desirable medium SNR could characteristics and recording and reproducing characteristics are shown in Table 6 below.

TABLE 6

| | Recording Layer 3 | tmag 3 (nm) | Ms (emu/cc) | Ms·t (emu/cc·nm) | OW (dB) | Re (%) | SNR (dB) | ATI |
|---|---|---|---|---|---|---|---|---|
| Example 4-1 | 66 at. % Co-12 at. % Cr-12 at. % Pt-10 at. % B | 3 | 596 | 1,788 | 31.6 | 55.4 | 23.7 | 0.31 |
| Example 4-2 | 66 at. % Co-12 at. % Cr-12 at. % Pt-10 at. % B | 3.5 | 596 | 2,086 | 32.3 | 54.2 | 23.6 | 0.19 |
| Example 4-3 | 66 at. % Co-12 at. % Cr-12 at. % Pt-10 at. % B | 4 | 596 | 2,384 | 33.2 | 53.2 | 23.3 | 0.24 |
| Example 4-4 | 60 at. % Co-12 at. % Cr-12 at. % Pt-16 at. % B | 4 | 411 | 1,644 | 32.1 | 54.4 | 23.2 | 0.26 |
| Example 4-5 | 60 at. % Co-12 at. % Cr-12 at. % Pt-16 at. % B | 5 | 411 | 2,055 | 33.2 | 53.2 | 22.8 | 0.52 |
| Example 4-6 | 63 at. % Co-15 at. % Cr-14 at. % Pt-8 at. % B | 4 | 406 | 1,624 | 32.3 | 54.7 | 23.1 | 0.18 |
| Example 4-7 | 63 at. % Co-15 at. % Cr-14 at. % Pt-8 at. % B | 5 | 406 | 2,030 | 33.4 | 53.8 | 23.3 | 0.33 |
| Example 4-8 | 63 at. % Co-13 at. % Cr-14 at. % Pt-8 at. % B-2 at. % Mo | 5 | 423 | 2,115 | 33.2 | 53.5 | 23.2 | 0.45 |
| Example 4-9 | 69 at. % Co-7 at. % Cr-14 at. % Pt-10 at. % Ta | 4 | 591 | 2,365 | 34.5 | 54.6 | 23.3 | 0.26 |
| Example 4-10 | 69 at. % Co-7 at. % Cr-14 at. % Pt-10 at. % Ti | 5 | 456 | 2,278 | 35.4 | 53.2 | 23.4 | 0.33 |

TABLE 6-continued

|  | Recording Layer 3 | tmag 3 (nm) | Ms (emu/cc) | Ms·t (emu/cc·nm) | OW (dB) | Re (%) | SNR (dB) | ATI |
|---|---|---|---|---|---|---|---|---|
| Comp. Ex. 4-1 | 66 at. % Co-12 at. % Cr-12 at. % Pt-10 at. % B | 5 | 596 | 2,980 | 36.8 | 48.4 | 22.5 | 2.45 |
| Comp. Ex. 4-2 | 66 at. % Co-12 at. % Cr-12 at. % Pt-10 at. % B | 6 | 596 | 3,576 | 37.2 | 46.1 | 21.7 | 2.93 |
| Comp. Ex. 4-3 | 66 at. % Co-12 at. % Cr-12 at. % Pt-10 at. % B | 7 | 596 | 4,172 | 37.5 | 44.6 | 21.1 | — |
| Comp. Ex. 4-4 | 60 at. % Co-12 at. % Cr-12 at. % Pt-16 at. % B | 6 | 411 | 2,466 | 35.8 | 47.3 | 22.6 | 1.45 |
| Comp. Ex. 4-5 | 60 at. % Co-12 at. % Cr-12 at. % Pt-16 at. % B | 7 | 411 | 2,877 | 36.4 | 45.5 | 21.8 | 2.23 |
| Comp. Ex. 4-6 | 64 at. % Co-12 at. % Cr-14 at. % Pt-10 at. % Ta | 4 | 241 | 962 | 26.5 | 53.3 | 18.2 | — |
| Comp. Ex. 4-7 | 64 at. % Co-12 at. % Cr-14 at. % Pt-10 at. % Ta | 8 | 241 | 1,925 | 33.1 | 46.5 | 21.3 | 2.24 |
| Comp. Ex. 4-8 | 64 at. % Co-12 at. % Cr-14 at. % Pt-10 at. % Ti | 4 | 347 | 1,386 | 27.7 | 53.4 | 19.5 | — |
| Comp. Ex. 4-9 | 64 at. % Co-12 at. % Cr-14 at. % Pt-10 at. % Ti | 6 | 347 | 2,080 | 33.8 | 47.3 | 20.5 | 1.86 |

From the comparison of Examples 4-1 to 4-3 and Comparative Examples 4-1 to 4-3, it can be seen that characteristics are largely varied by the formation of the thicker layer even when the third recording layer of the same composition is used. It can be seen that the media in the Examples are high in resolution and medium SNR, and excellent in ATI. Contrary to this, in Comparative Examples 4-1 to 4-3, high OW was obtained due to the fact that the thickness of the third recording layer was thick, but resolution lowered and ATI was inferior. This is presumably for the reasons that even if intergranular interaction in the granular recording layer is sufficiently reduced, when the non-granular structural recording layer is formed thick, magnetic cluster size becomes large and liable to be influenced by the contiguous track, as a result ATI caused sudden degraded.

Further, Examples 4-5, 4-7 and Comparative Example 4-1 are greatly different in characteristics, although the thicknesses of the third recording layers are the same. These media have different Ms of the third recording layers, and the range of the optimal film thickness is different. That is, it is thought to be necessary to adjust the product of Ms and thickness (Ms·t). Examples 4-8 to 4-10 are media in which the elements constituting the third recording layer are changed, and they showed to have good characteristics since Ms·t of each medium was adjusted to a proper range. Contrary to this, in Comparative Examples 4-6 to 4-9, OW was insufficient in the region as thin as 4 nm, since Ms was low even using the same material. OW can be sufficiently obtained when the layers are formed thick to make Ms·t equal, but they are accompanied by the reduction of resolution and ATI.

Therefore, it is important to form the third recording layer not thick in film thickness and adjust Ms·t, and the elements added are not so important. However, the comparison was performed on the condition of the thickness of the soft magnetic layer in the Examples of 30 nm, and when the thickness of the soft magnetic layer is changed, magnetic field gradient of head also changes, so that the adjustment fitting to each condition is necessary.

EXAMPLE 5

Figure 4:
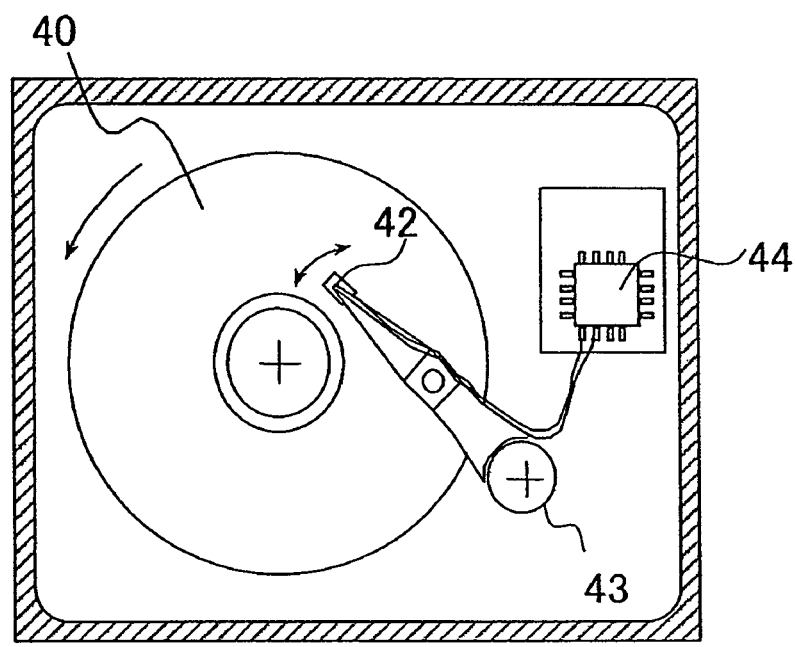
FIGS. 4(a) and 4(b) are typical cross-sectional drawings showing the magnetic storage device as one example of embodiments of the invention.
Figure 4:
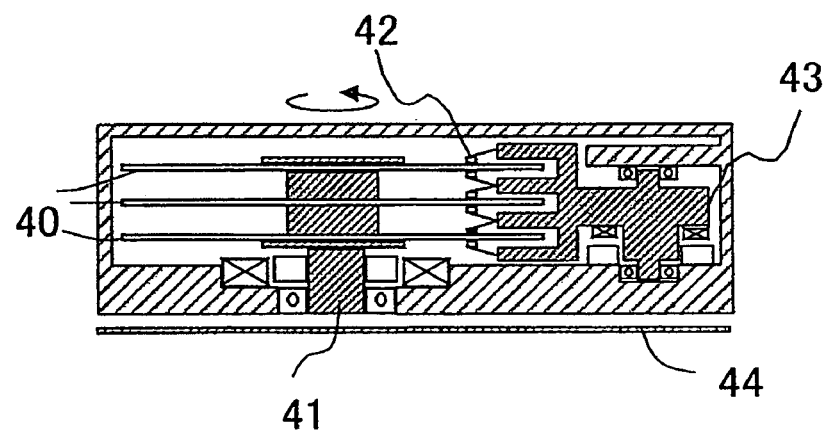

A typical cross-sectional drawing of the magnetic storage device as one example of embodiments of the invention is shown in FIGS. 4(a) and 4(b). Magnetic recording medium 40 consists of the medium in the above Example, which is composed of magnetic recording medium-driving part 41, magnetic head 42 comprising a recording part and a reproducing part, means 43 to move the magnetic head to the magnetic recording medium by relative motion, and means 44 performing input and output of signals to the magnetic head.

Figure 5:
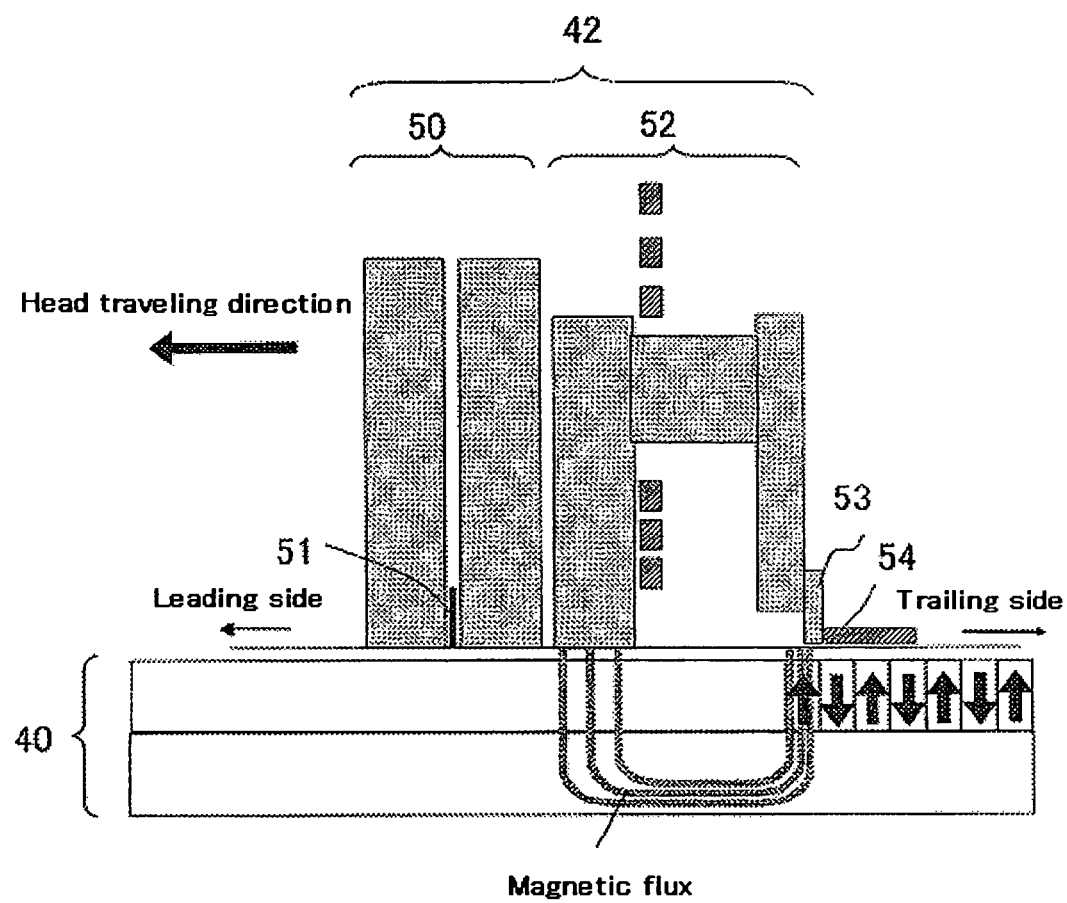
FIG. 5 is a typical drawing showing the relationship between the magnetic head and the magnetic recording medium.

The relationship between the magnetic head 42 and the magnetic recording medium 40 is shown in FIG. 5. The magnetic flying height of the magnetic head is 8 nm, and a tunnel magnetoresistance device (TMR) is used in reproducing device 51 of reproducing part 50. Wrap around shield 54 is formed around main magnetic pole 53 of recording part 52 of the magnetic head. Overwriting characteristics can be improved while maintaining high medium S/N by the use of the magnetic head having formed shield around the main magnetic pole of the recording part, and by track recording density of 630,000 bit per 1 cm, and track density of 111,420 track per 1 cm, operation at recording density of 70.1 gigabit per 1 cm$^2$ was confirmed.

When a CPP-GMR device is used besides reproducing device 51 shown in FIG. 5, the same effect can be obtained.

According to embodiments of the invention, since medium S/N can be improved without adding excess amount of oxides of the granular recording layer, a perpendicular magnetic recording medium capable of high density recording and having high reliability durable for a long period of time can be provided. By the use of such a perpendicular magnetic recording medium, a magnetic storage device of a small size and high capacity can be provided.

What is claimed is:

1. A perpendicular magnetic recording medium comprising:
    a substrate having thereon at least a soft magnetic layer, a nonmagnetic intermediate layer, a perpendicular recording layer and a protective layer formed in that order, wherein the perpendicular recording layer consists of three or more layers of a first recording layer, a second recording layer and a third recording layer from the side nearer to the substrate;
    wherein the first recording layer and the second recording layer have a granular structure comprising a grain boundary of an oxide surrounding ferromagnetic crystal grains containing Co and Pt, and the third recording layer has a non-granular structure mainly comprising Co and not containing an oxide;
    wherein the grain boundary of the first recording layer contains Si, Cr and oxygen, and at least one element selected from Ti, Ta and Nb, and the grain boundary of the second recording layer contains Cr and oxygen and at least one element selected from W and V, wherein the first recording layer has a different composition than said second recording layer.

2. The perpendicular magnetic recording medium as claimed in claim 1, wherein the thickness of the second recording layer is 0.2 nm or more and 5 nm or less.

3. The perpendicular magnetic recording medium as claimed in claim 1, wherein the concentration of Cr contained in the first recording layer is more than 4 at. % and less than 14 at. %.

4. The perpendicular magnetic recording medium as claimed in claim 2, wherein the concentration of Cr contained in the first recording layer is more than 4 at. % and less than 14 at. %.

5. The perpendicular magnetic recording medium as claimed in claim 1, wherein the concentration of the oxide contained in the second recording layer is more than 10 vol. % and less than 30 vol. %.

6. The perpendicular magnetic recording medium as claimed in claim 2, wherein the concentration of the oxide contained in the second recording layer is more than 10 vol. % and less than 30 vol. %.

7. The perpendicular magnetic recording medium as claimed in claim 3, wherein the concentration of the oxide contained in the second recording layer is more than 10 vol. % and less than 30 vol. %.

8. The perpendicular magnetic recording medium as claimed in claim 4, wherein the concentration of the oxide contained in the second recording layer is more than 10 vol. % and less than 30 vol. %.

9. A magnetic storage device comprising:
- a magnetic recording medium, and a means for driving the magnetic recording medium in the recording direction;
- a magnetic head equipped with a recording part and a reproducing part and a means for driving the magnetic head relatively to the magnetic recording medium; and
- a signal treatment means of wave form treatment of an input signal and output signal to the magnetic head;
- wherein the magnetic recording medium is a perpendicular magnetic recording medium comprising a substrate having thereon at least a soft magnetic layer, a nonmagnetic intermediate layer, a perpendicular recording layer and a protective layer in this order, the perpendicular recording layer consists of three or more layers of a first recording layer, a second recording layer and a third recording layer from the side nearer to the substrate;
- wherein the first recording layer and the second recording layer have a granular structure comprising a grain boundary of an oxide surrounding ferromagnetic crystal grains containing Co and Pt, and the third recording layer has a non-granular structure mainly comprising Co and not containing an oxide; and
- wherein the grain boundary of the first recording layer contains Si, Cr and oxygen, and at least one element selected from Ti, Ta and Nb, and the grain boundary of the second recording layer contains Cr and oxygen and at least one element selected from W and V, wherein the first recording layer has a different composition than said second recording layer.

10. The magnetic storage device as claimed in claim 9, wherein the thickness of the second recording layer is 0.2 nm or more and 5 nm or less.

11. The magnetic storage device as claimed in claim 9, wherein the concentration of Cr contained in the first recording layer is more than 4 at. % and less than 14 at. %.

12. The magnetic storage device as claimed in claim 10, wherein the concentration of Cr contained in the first recording layer is more than 4 at. % and less than 14 at. %.

13. The magnetic storage device as claimed in claim 9, wherein the concentration of the oxide contained in the second recording layer is more than 10 vol. % and less than 30 vol. %.

14. The magnetic storage device as claimed in claim 10, wherein the concentration of the oxide contained in the second recording layer is more than 10 vol. % and less than 30 vol. %.

15. The magnetic storage device as claimed in claim 11, wherein the concentration of the oxide contained in the second recording layer is more than 10 vol. % and less than 30 vol. %.

16. The magnetic storage device as claimed in claim 12, wherein the concentration of the oxide contained in the second recording layer is more than 10 vol. % and less than 30 vol. %.

* * * * *